United States Patent
Nagorcka et al.

(10) Patent No.: US 6,810,975 B2
(45) Date of Patent: Nov. 2, 2004

(54) SUSPENSION SYSTEM FOR A TRACKED VEHICLE

(75) Inventors: James A. Nagorcka, Hamilton (AU); Lyal Allen, Hamilton (AU)

(73) Assignee: WesternGaco A.S., Asker (NO)

(*) Notice: Subject to any disclaimer, the term of this patent is extended or adjusted under 35 U.S.C. 154(b) by 0 days.

(21) Appl. No.: 10/302,735

(22) Filed: Nov. 22, 2002

(65) Prior Publication Data

US 2004/0099451 A1 May 27, 2004

Related U.S. Application Data

(60) Provisional application No. 60/382,640, filed on May 23, 2002.

(51) Int. Cl.$^7$ ............................................. B62D 55/084
(52) U.S. Cl. ................................. 180/9.5; 280/124.156
(58) Field of Search .................... 180/9.1, 9.5, 9.54; 280/104, 124.156, 124.116

(56) References Cited

U.S. PATENT DOCUMENTS

| | | | |
|---|---|---|---|
| 6,284 A | 2/1875 | Reese | |
| 3,826,325 A | 7/1974 | Purcell et al. | |
| 3,938,606 A | 2/1976 | Yancey | |
| 4,364,443 A | * 12/1982 | Sato et al. | 180/9.5 |
| 4,838,373 A | * 6/1989 | Price et al. | 180/9.46 |
| 4,923,210 A | * 5/1990 | Heider et al. | 280/6.153 |
| 4,953,919 A | 9/1990 | Langford | |
| 5,273,126 A | 12/1993 | Reed et al. | |
| 5,352,029 A | 10/1994 | Nagorcka | |
| 5,447,365 A | 9/1995 | Muramatsu et al. | |
| 5,458,359 A | * 10/1995 | Brandt | 280/124.111 |
| 5,533,587 A | 7/1996 | Dow | |
| 5,899,543 A | 5/1999 | Lykken et al. | |
| 5,938,301 A | 8/1999 | Hostetler et al. | |
| 6,062,661 A | 5/2000 | Juncker et al. | |
| 6,139,121 A | 10/2000 | Muramatsu | |
| 6,145,609 A | * 11/2000 | Hoelscher | 180/9.44 |
| 6,176,334 B1 | 1/2001 | Lorenzen | |
| 6,247,547 B1 | 6/2001 | Lemke et al. | |
| 6,283,562 B1 | 9/2001 | Tsubota et al. | |
| 6,318,484 B2 | 11/2001 | Lykken et al. | |
| 6,401,847 B1 | * 6/2002 | Lykken | 180/9.1 |

FOREIGN PATENT DOCUMENTS

DE     129806 A2 *    6/1984

OTHER PUBLICATIONS

U.S. patent application Publication Pub. No. US 2001/0030068 A1, Pub. Date Oct. 18, 2001, James Nagorkca, et al.
www.alasawild.org/seismic.html article entitled "Drilling For Oil In the Artic Refuge Seismic Exploraton"—Hartford Courant (Jan. 8, 2001).
National Post On Line–Nov., 1999 Calgary's Boom, entitled "Drilling Down on Costs with Virtual Discoveries" by George Koch in Calgary.
Pesa News, Jun./Jul. 2001 Issue No. 52, p. 58, Australian Research and Development, Desert Ex;lorer Minimises Environmental Footprint.

* cited by examiner

*Primary Examiner*—Kevin Hurley
(74) *Attorney, Agent, or Firm*—Streets & Steele; Jeffrey L. Streets; Steven L. Christian

(57) ABSTRACT

A suspension system for a tracked vehicle, preferably having rubber tracks. The track assembly is mounted on a pivot shaft such that it can oscillate about the axis of the pivot shaft. The suspension system allows the track assembly to move vertically relative to the vehicle chassis to compensate for uneven terrain. For instance the track assembly can compensate for depressions or bumps in the terrain and preclude the chassis of the vehicle from tilting with each minor change in the terrain. In addition, the track assembly movement in the vertical direction provides a much smoother ride than do traditional tracked vehicles. The suspension system of the present invention is provided for use with a pair of track assemblies.

16 Claims, 4 Drawing Sheets

SUSPENSION SYSTEM FOR A TRACKED VEHICLE

This Application claims priority to copending U.S. Provisional Patent Application Ser. No. 60/382,640 filed on May 23, 2002.

BACKGROUND OF THE INVENTION

1. Field of the Invention

The present invention relates to a suspension system and oscillating undercarriage for a tracked vehicle.

2. Description of the Related Art

A variety of track systems have been developed for use with heavy duty off road vehicles, such as construction or exploration vehicles. A common track system includes a front idler wheel and a rear drive sprocket over which the continuous track is draped. Another system is known as a triangular track system in which a track frame is pivotally mounted to a pivot shaft on a vehicle. Front and rear idler wheels are mounted at opposing ends of the track frame. The drive sprocket is rotatably mounted on the vehicle above the pivot shaft. A continuous track engages the drive sprocket and the two idler wheels in a triangular configuration. The advantage of the triangular configuration is that the drive sprocket is mounted above the ground surface, thus freeing it from dirt and debris, prolonging its life. Additionally, the drive sprocket construction can be lightened because it is not required to carry a part of the vehicle load.

A distinguishing feature of the triangular track system is that as the track frame rocks about the pivot shaft, the geometry associated with the idler wheels and the drive sprocket changes. For example, as the track frame rocks from the horizontal, the circumference around the idler wheels and drive sprocket is reduced, thus causing slack in the track. Slack in the track is undesirable because it allows the track to become disengaged from either the idler wheels or sprocket or both. In addition, a certain amount of preload tension in the track is desirable to maintain the track, idler wheels and sprocket in engagement. The preload tension should be minimal in value and remain essentially constant to minimize wear on the component parts of the track system. While a spring-loaded idler wheel can take up the slack and maintain the preload tension, such a track system does not provide the fixed axle vehicle with any suspension.

One attempt at providing suspension for a triangular track system is disclosed in U.S. Pat. No. 5,273,126. This system includes a drive sprocket that remains positionally fixed relative to the vehicle body, a rear idler wheel and track-engaging ground rollers that are coupled to, and move with, a swing link that is secured by a spring suspension, and a compensator idler. Accordingly, the suspension is included within the track system itself.

What is needed is a track suspension system that is rugged and durable. What is needed is a suspension system for a tracked vehicle that does not require major redesign of the track assembly. It would be desirable if the vehicle suspension provided a smooth ride, both for operator comfort and for the care of expensive equipment carried by the vehicle. Furthermore, it would be desirable if the vehicle had a track with sufficient surface area to reduce the ground pressure exerted by the vehicle in order to minimize environmental impact.

SUMMARY OF THE INVENTION

The present invention provides a track suspension system for a vehicle. The suspension system includes a main axle beam supporting one or more attachment beams extending from the main axle beam toward the front of the vehicle. The attachment beams are connected to the vehicle chassis via a spherical bearing. The main axle beam also contains pivot shafts on both ends, wherein track assemblies are pivotally connected thereto. In addition, the main axle beam is connected through a spherical bearing to a first shock-absorbing member at a first end of the main axle beam and through a spherical bearing to a second shock-absorbing member at a second end of the main axle beam. The other ends of the shock-absorbing members are connected through spherical bearings to the vehicle chassis.

The system further comprises a centralizer that maintains the side-to-side alignment of the main axle beam beneath the vehicle chassis while allowing relative up and down movement. A preferred centralizer is referred to as a side location rod or panhard rod and is coupled to the main axle beam at or near the first end of the main axle beam and to the vehicle chassis adjacent to a second end of the main axle beam. Preferably, spherical bearings are used at the interface between the centralizer and main axle beam and the interface between the centralizer and vehicle chassis. Other suitable centralizers include, without limitation, a watts linkage and a Jacob's ladder.

The shock absorbing members provide the primary support for the vehicle chassis, and the shock absorbing members may have a variety of configurations, including single or double-sided displacement cylinders or air springs. It is preferable that the shock absorbing members are single or double-sided displacement cylinders, and that they are in fluid communication with an accumulator, wherein the accumulator comprises a gas chamber and a working fluid chamber. The gas chamber and the working fluid chamber are maintained at the same pressure, and typically, the working fluid fills the working fluid chamber and the displacement cylinder. The gas chamber is typically pressurized sufficiently such that the weight of the vehicle is supported at a position approximately halfway through the displacement cylinder range of extension. Alternatively, the system may comprise a hydraulic pressure source in fluid communication with the displacement cylinders for extending and retracting the cylinder.

Each track assembly comprises a track frame that has first and second ends, wherein the track frame is mounted for rocking movement on the pivot shaft at a location between the first and second ends of the track frame. The track assembly further comprises a drive wheel, disposed above and adjacent to the pivot shaft, that engages a track. In addition, an idler wheel link is pivotally mounted to the first end of the track frame and extends upward ending in an upward end. A first idler wheel is rotationally mounted on the idler wheel link, and a second idler wheel is rotationally mounted on the second end of the track frame. In addition, a track extends around the drive wheel, the first idler wheel and the second idler wheel on portions of their respective circumferences. The idler wheel link is further provided with a take up means for moving the first idler wheel away from the pivot shaft to maintain a substantially constant circumference around the idler wheels and drive wheel and a constant tension on the track. The preferred track is a rubber track. The track assembly described above is a preferred example, but other track assemblies may work equally well in association with the present invention and are considered to be within the scope of the invention.

DETAILED DESCRIPTION OF THE PREFERRED EMBODIMENT

Figure 1:
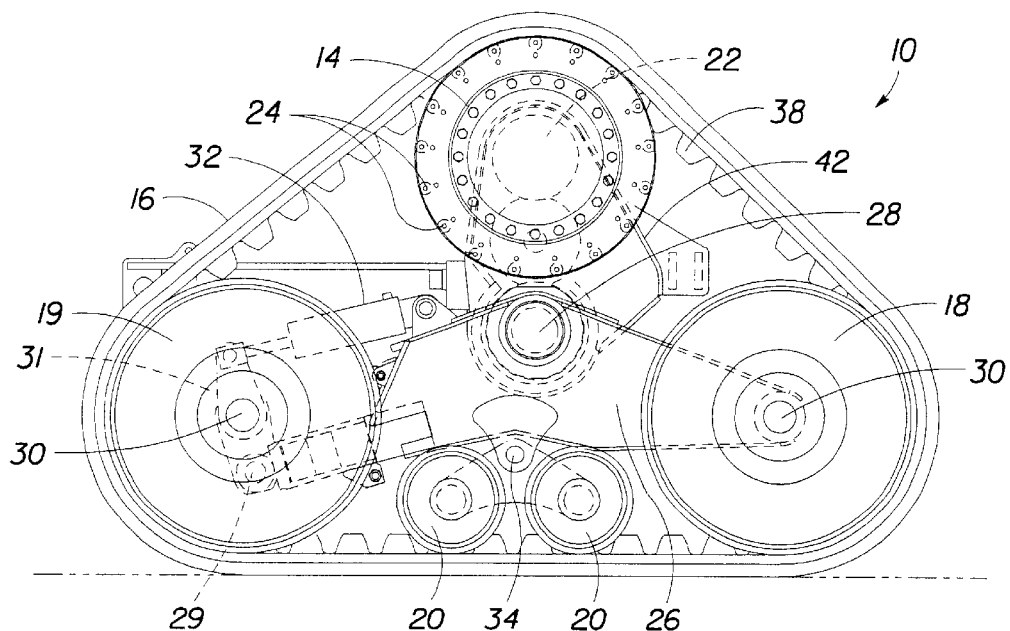
FIG. 1 is a side view of a triangular track assembly.

The invention relates to a suspension system for a tracked vehicle. The following description is directed to a preferred embodiment of the invention and should not be taken as limiting the scope of the invention. Accordingly, the preferred embodiment includes a track assembly mounted on a pivot shaft such that it can oscillate about the axis of the pivot shaft. The suspension system allows the track assembly to move vertically relative to the vehicle chassis to compensate for uneven terrain. For instance, the track assembly can compensate for depressions or bumps in the terrain and preclude the chassis of the vehicle from tilting with each minor change in the terrain. In addition, the track assembly movement in the vertical direction provides a much smoother ride than do traditional tracked vehicles. The suspension system of the present invention is provided for use with a pair of track assemblies. Preferably, a tracked vehicle having a pair of track assemblies coupled to the present suspension system will also have another set of wheels or tracks at the opposite end of the vehicle, either front or rear of the vehicle. Most preferably, a tracked vehicle in accordance with the present invention has both front and back suspension systems each supporting a pair of track assemblies.

The system comprises a main axle beam. At both ends of the main axle are pivot shafts with track assemblies mounted thereto. The track assembly is mounted such that the track assembly can pivot about the axis of the pivot shaft. Because the main axle beam indirectly supports the weight of the vehicle, the main axle beam must be constructed from material that can withstand a substantial portion of the weight of the vehicle. In addition, the pivot shafts on each end of the main axle beam are exposed to a portion of the load of the vehicle and must be constructed to support the weight shouldered by each track assembly.

The system further comprises an attachment beam that extends forward from the main axle beam for coupling to the chassis of the vehicle. The attachment beam transmits drive forces generated by the track assemblies to the vehicle chassis. Preferably the invention comprises a plurality of attachment beams such that the loading of any single beam of a plurality of beams is significantly less than that of a single beam. Most preferably, the invention comprises two attachment beams that are attached toward the front of the vehicle.

The system further comprises a pair of track assemblies pivotally coupled to the pivot shafts, each track assembly comprising a track, a drive wheel for engaging and turning the track, and idler wheels. The track assembly preferably includes two large idler wheels with two smaller idler wheels between the two larger idler wheels to distribute the vehicle load evenly over the downwardly-directed surface area of the track. It is also preferred that one of the large idler wheels is dynamically adjusted, such as by a spring, so that a substantially constant tension can be maintained.

A vehicle chassis provides the support structure for the remainder of the vehicle, including the engine, cab, equipment and the like. The chassis is preferably coupled to the attachment beams by a spherical bearing. It is also preferred that the complete chassis is an articulated chassis such that the vehicle is steered by the side-to-side articulation or bending of the chassis in the region between front and back pairs of track assemblies or sets of wheels.

The system further comprises first and second shock absorbing members supporting the chassis over the main axle beam. The first and second shock absorbers are coupled between the main axle beam and the chassis by spherical bearings at each end of the shock absorbers. The shock absorbing members can be of any known type, including air shocks, springs, displacement cylinders providing a load and non-load side, or any combination thereof. For use as a vibrator vehicle, it is most preferable that each shock absorbing member is a combination of two air springs to achieve a compound spring rate, where a first air spring supports the weight of the chassis over the undercarriage and a second air spring provides a function of damping for the suspension and a function as a hold-down of the chassis to the axle during vibrator operation.

The system also includes a centralizer for controlling or maintaining the transverse or side-to-side alignment of the main axle beam and track assemblies with respect to the vehicle chassis. The centralizer can comprise a rigid bar, spring, displacement cylinder, a plurality of these items, or any combination thereof. The centralizer must further be mounted between the vehicle chassis and the main axle beam to restrict transverse movement of the main axle beam such that the vehicle chassis centerline and the main axle beam bisecting line stay substantially parallel. A preferred centralizer comprises a rigid bar and is connected between the main axle beam and the vehicle chassis by a spherical bearing at each end.

FIG. 1 is a side view of a single-track assembly suitable for use in accordance with the present invention. The track assembly 10 has a drive wheel 14, which propels a track 16 in a desired direction. The drive wheel 14 is connected to a hub 22 that supports the drive wheel 14 and supplies the necessary torque to the drive wheel 14 to engage and move the track. Engaging pins 24 are rigidly mounted to the drive wheel 14 and rotate with the drive wheel 14. The rotation of the engaging pins causes an engagement between the pins 24 and the track guide lugs 38 on the backside of the track 16. Therefore, the track guide lugs 38 are driven by the drive wheel 14 in a manner that the track 16 moves at the tangential velocity of the engaging pins 24.

The track assembly further comprises two large idler wheels 18, 19 that support a portion of the weight of a vehicle (not shown). The undercarriage beam 26 provides a mount 30 for one of the large idler wheels 18, a mount 29 for pivotally coupling a link 31 for the other large idler wheel 19, and a mount 34 for both of the smaller idler wheels 20. In addition, a hydraulic cylinder 32 is coupled between the undercarriage beam 26 and the link 31, such that the idler wheel 19 is dynamically adjusted to maintain a substantially constant tension on the track and a substantially constant circumference around the drive wheel and idler wheels. For instance, if the tension in the track is below normal, (i.e. the circumference of the drive wheel and idler wheels was less than prescribed) the idler wheel 19 is biased by the cylinder 32 in a direction away from the pivot shaft 28 until the tension in the track 16 returns to normal. If the tension in the track is greater than normal, the track biases the idler wheel in a direction toward the pivot shaft 28 and against the cylinder 32 until the tension in the track returns to normal.

The undercarriage beam 26 is supported by the pivot shaft 28, thereby allowing the undercarriage beam 26 significant latitude for angular displacement. The undercarriage further provides the smaller idler wheels 20 with an opportunity for significant angular movement via the angular axle mount 34. For instance, if the vehicle were encountering an incline such that the rear portion of the vehicle was not yet at the incline but the front portion of the vehicle was engaging the incline, then the track assembly 10 could pivot about the pivot shaft 28. For example, the track assembly 10 may pivot to allow the idler wheel 19 to rise up and lead the rest of the track assembly over the incline. The track assembly 10 would operate in much the same fashion if the vehicle encountered a decline.

Figure 2:
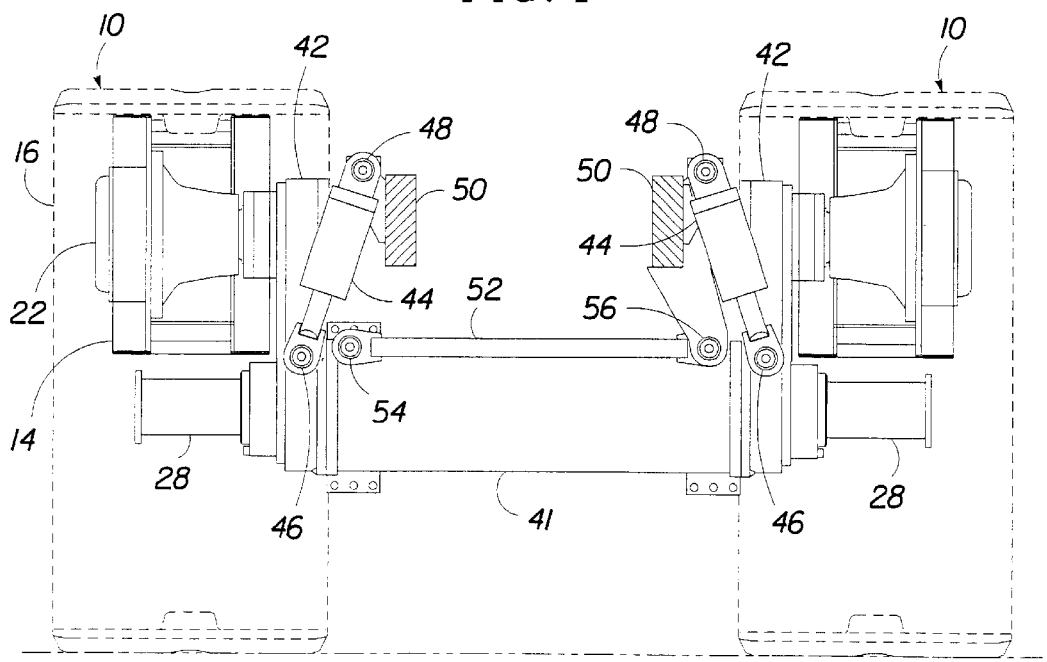
FIG. 2 is a back view of a suspension system in accordance with the invention.

FIG. 2 is a back end view of the suspension system 40 supporting the chassis 50 over the main axle beam 41. The pivot shafts 28 are located at both ends of the main axle beam 41 and receive support from a pair of track assemblies 10. The main axle beam 41 supports the hubs 22 of each track assembly via axle extensions 42. The vehicle chassis 50 is coupled to, and receives support from, the main axle beam 41 via a pair of shock absorbers 44 that are disposed at opposing ends of the main axle beam. Each of the shock absorbers 44 have one end coupled to the main axle beam 41 by a spherical bearing 46 and a second end coupled to the chassis of the vehicle 50 by a spherical bearing 48. The chassis 50 is maintained in transverse alignment above the main axle beam 41 by a centralizer 52. A first end of the centralizer 52 is coupled to one side of the main axle beam 41 by a spherical bearing 54 and an opposite end of the centralizer 52 is coupled to the vehicle chassis 50 by a spherical bearing 56. In this manner, the centralizer 52 allows free and substantially vertical up and down movement of the main axle beam 41 relative to the chassis 50, but substantially eliminates or restricts side-to-side (transverse) movement of the main axle beam relative to the chassis.

Figure 3:
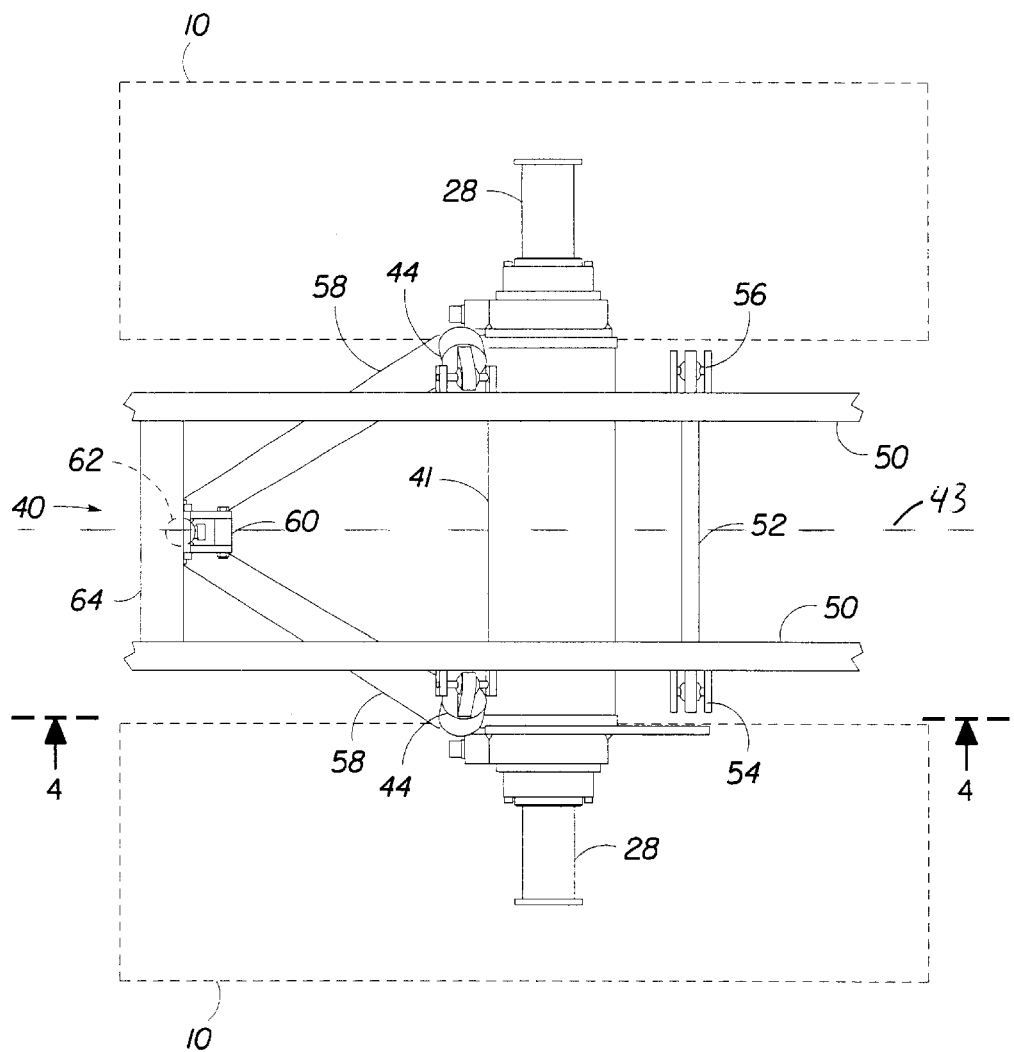
FIG. 3 is a plan view of the chassis connection to the main axle.

FIG. 3 is a plan view of the suspension system 40 showing each of the connections between the chassis 50 and the main axle beam 41. The main axle beam 41 has attachment beams 58 connected on both ends of the main axle beam 41 between the track assemblies 10. The attachment beams 58 extend in the forward direction (toward the forward end of the vehicle) from the main axle beam 41 and converge along a line 43 that bisects the main axle beam 41 such that the attachment beams 58 form an "A" configuration 60 with the main axle beam 41. The forward end of the attachment beams 58 is coupled by a spherical bearing 62 to a brace 64 that forms part of the chassis 50. The spherical bearing 62 allows the attachment beams 58 to pivot in a substantially spherical motion relative to the chassis, except as limited by the shock absorbing members 44 (primarily a limitation on vertical motion) and the centralizer 52 (primarily a limitation on horizontal motion).

Figure 4:
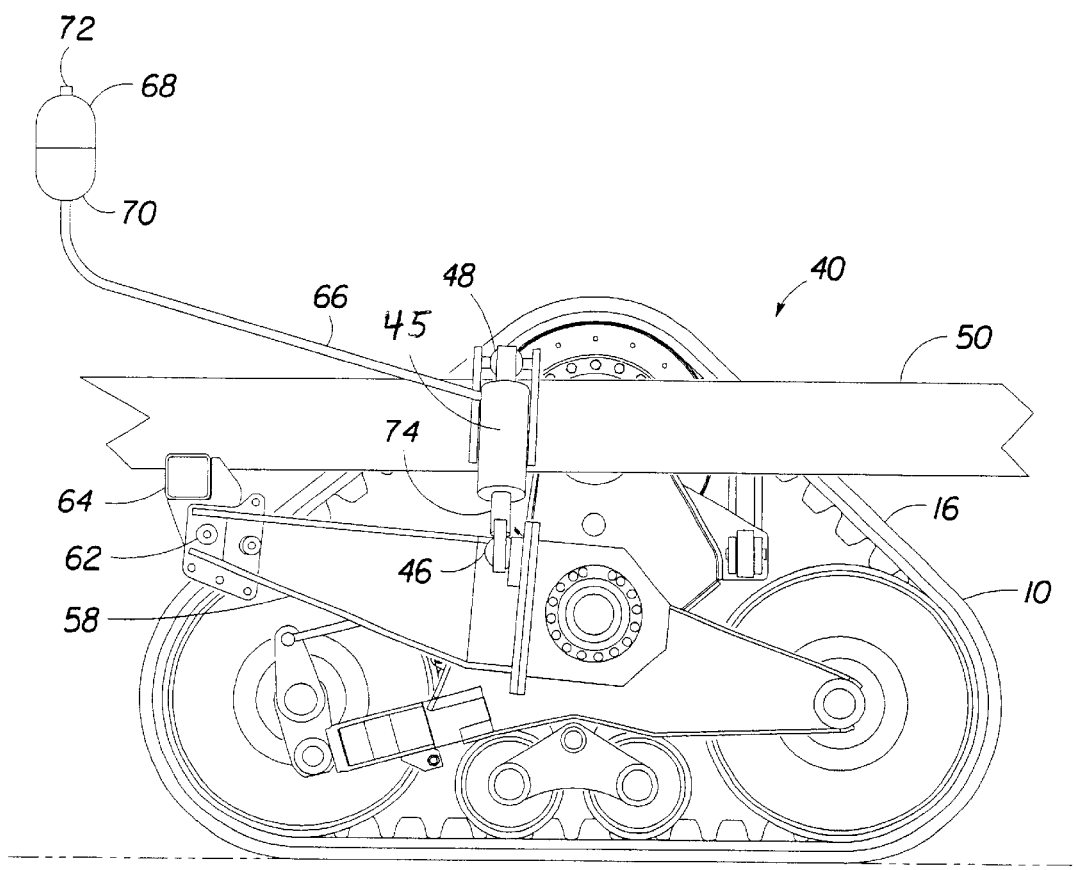
FIG. 4 is a cross-sectional side view of the suspension system.

FIG. 4 is a cut-away side view of the suspension system 40. Spherical bearings 48 and 46 are employed in connecting the displacement cylinder 45 (only one cylinder shown in this view) between the vehicle chassis 50 and the main axle beam 41. The displacement cylinder 45 typically comprises a piston-cylinder arrangement containing a load bearing chamber formed on one side of the piston filled with a working fluid. A hydraulic hose 66 provides fluid communication between the displacement cylinder 45 on the load bearing side and a hydraulic accumulator 68.

Under normal operating conditions, the hydraulic accumulator 68 is filled with both a working fluid and a gas. A membrane or piston typically separates a working fluid chamber 70 and a gas chamber 72, thereby allowing the fluid pressure in each chamber to equalize. Normally, the gas chamber 72 is charged with sufficient gas to support the static weight of the vehicle at a position about halfway through the range of the displacement cylinder 45.

In the event that the track assembly 10 encounters a reduced load, such as by traveling over a recess in terrain, the gas pressure in gas chamber 72 of the hydraulic accumulator 68 would force working fluid from the working fluid chamber 70 into the hydraulic hose 66, thereby forcing working fluid into the load side of the displacement cylinder 45. The extra working fluid forced into the displacement cylinder 45 causes the displacement cylinder to extend rod 74. The extension of rod 74 causes the track assembly 10, which is connected to rod 74, to move downward away from the vehicle chassis 50 and follow the recessed terrain. As the recess in the terrain is passed, the track assembly 10 would return to the normal position, causing rod 74 to recess slightly into the displacement cylinder 45. The recess of rod 74 would cause the working fluid level in the working fluid chamber 70 to rise and therefore, cause the gas pressure in the gas chamber 72 to increase up to the normal or preset level.

In the event that the track assembly encounters an increased load such as by traveling over a rise in the terrain, the track assembly 10 and the main axle beam 41 would be forced upward, toward the vehicle chassis 50. The upward movement of the main axle beam 41 forces the rod 74 to recess into the displacement cylinder 45, thereby forcing working fluid from the cylinder 45 into the hydraulic hose 66. The working fluid would further be forced into the hydraulic accumulator 68, which would increase the level of working fluid in the working fluid chamber 70. This increase causes the gas pressure in the accumulator 68 to increase as well. As the rise in the terrain is passed, the track assembly would return to the normal position, causing the rod 74 to extend slightly and therefore cause the level of the working fluid in the accumulator 68 to decrease and allow the gas pressure in the accumulator to drop to its normal level as well.

Figure 5:
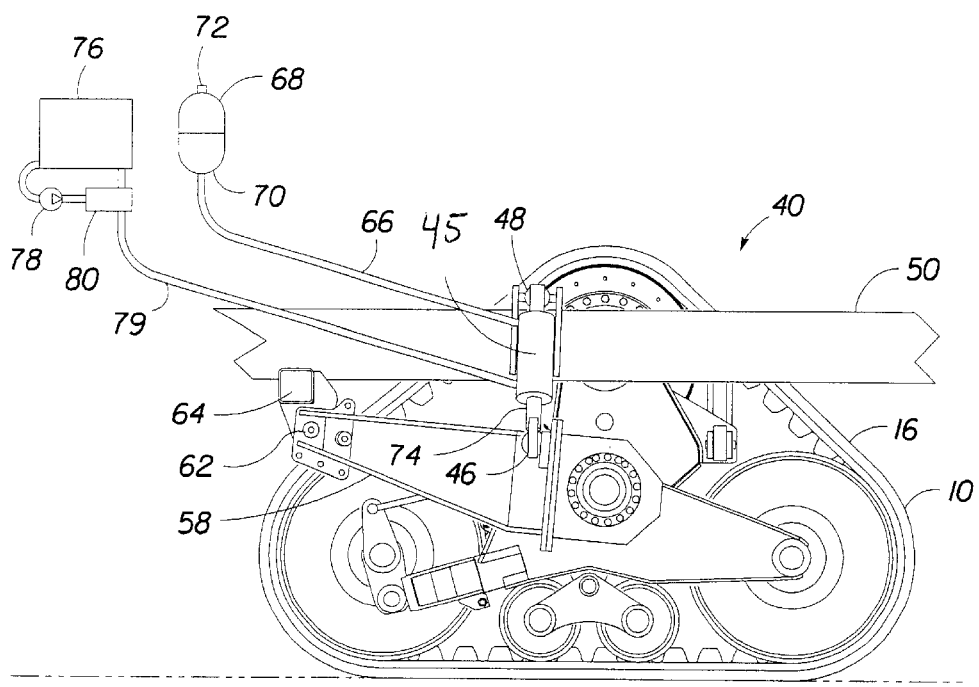
FIG. 5 is a cross-sectional side view of an alternate embodiment of the suspension system.

FIG. 5 is a cut-away side view of the suspension system 40 showing an alternate embodiment of the displacement cylinders 45. In this embodiment, the suspension system is augmented by a working fluid reservoir 76, hydraulic pressure source 78, and a valve 80. The displacement cylinder 45 has a load bearing side in fluid communication with the hydraulic hose 66 connected to the accumulator 68. In addition, the non-load bearing side of the displacement cylinder is in fluid communication with a hydraulic hose 78 that is also connected to the working fluid reservoir 76.

During normal operation (i.e. the track assembly 10 is operating on terrain that is level with respect to the other track assemblies of the vehicle) both the load-bearing side and the nonload-bearing side of the displacement cylinder 45 are filled with working fluid. The working fluid reservoir 76, under normal operating conditions, can expel or receive working fluid as the need arises. Therefore, if the track assembly 10 encountered a recess in the terrain, rod 74 would extend to force the track assembly to follow the recessed terrain. In doing so, working fluid from the non-load side of the displacement cylinder 45would be forced into the working fluid reservoir 76. If the track assembly 10 encountered a rise in the terrain, then rod 74 would recess into the displacement cylinder 45, thereby causing working fluid to flow into the non-load side of the displacement cylinder 45.

This alternative embodiment offers the distinct advantage of being able to raise the track assembly 10 from the terrain because the working fluid reservoir 76 is further equipped with a hydraulic pressure source 78 and a valve 80. The valve 80, under normal operation, can allow the non-load side of the displacement cylinder to have fluid communication with the working fluid reservoir 76, thereby allowing normal operation as described above. To raise the track assembly 10, the valve 80 may be closed to preclude fluid communication between the non-load side of the displacement cylinder 45 and the working fluid reservoir 76. The hydraulic pressure source 78 then provides a pressure substantial enough to overcome that of the gas in the accumulator 68. Because the hydraulic pressure source 78 forces working fluid into the non-load side of the displacement cylinder 45, the pressure on the non-load side of the displacement cylinder 45 becomes greater than the pressure in the load side of the displacement cylinder. This pressure differential causes rod 74 to recess into the displacement cylinder 45. The recess of rod 74 causes the working fluid in the load side of the displacement cylinder to flow into the accumulator 68. The recess or retraction of rod 74 further causes the cylinder 45 to contract and the track assembly 10 to move generally upward toward the vehicle chassis 50.

Figure 6:
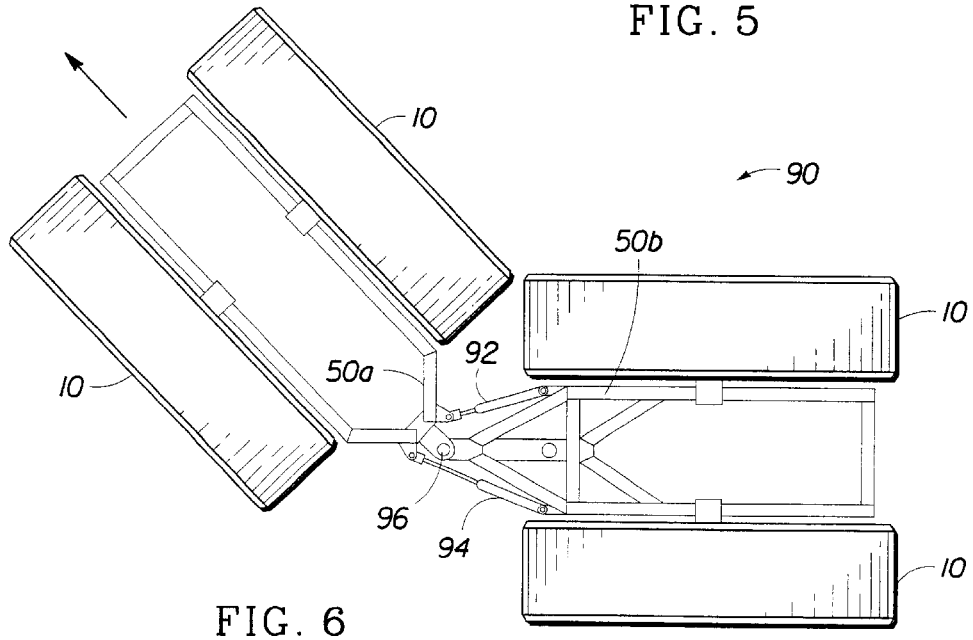
FIG. 6 is a schematic bottom view of a vehicle having an articulated steering mechanism.

FIG. 6 is a schematic bottom view of a vehicle 90 having an articulated steering mechanism suitable for use with the present invention. A right double-action hydraulic steering cylinder 92 and a left double-action hydraulic steering cylinder 94 are disposed on opposite sides of an articulating joint 96 and are connected through spherical joints (otherwise known as ball joints) at their forward ends to a front chassis portion 50A and through spherical joints at their rear ends to a rear chassis portion 50B.

The vehicle 90 is turned, or steered, as shown by extending the left steering cylinder 94 while simultaneously retracting the right steering cylinder 92, thereby causing the front chassis portion 50A to turn to the right with respect to the rear chassis portion 50B. The rear chassis portion will follow the front chassis portion on nearly the same track. Preferably, the front and rear differentials permit the right side power units to turn faster than the left side power units, thereby turning the vehicle in an arc to the left with minimal added horsepower required and with minimal scrubbing and damage to the surface under the tracks. Turning to the right is accomplished by reversing the actions of the two steering cylinders. The articulated joint 96 is designed and placed such that even at maximum stroke of the cylinders there is no interference between the tracks 10 of the power units on the front chassis 50A and rear chassis 50B.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A track suspension system for a vehicle, comprising:
    a main axle beam having first and second beam ends forming pivot shafts;
    at least one attachment beam extending from the main axle beam toward the forward of the vehicle;
    a track assembly pivotally connected to each of the pivot shafts;
    a vehicle chassis coupled by a spherical bearing to the at least one attachment beam;
    a first shock absorbing member having a first end coupled by a spherical bearing to the main axle beam near the first beam end and a second end coupled by a spherical bearing to the chassis;
    a second shock absorbing member having a first end coupled by a spherical bearing to the main axle beam near the second beam end and a second end coupled by a spherical bearing to the chassis; and
    a centralizer coupled between the main axle beam and the chassis.

2. The system of claim 1, wherein the spherical bearing that couples the vehicle chassis to the attachment beam is positioned along the centerline of the vehicle.

3. The system of claim 1, wherein the centralizer keeps the main axle beam substantially centered with the centerline of the vehicle.

4. The system of claim 1, wherein the centralizer comprises a side location rod having a first rod end coupled by a spherical bearing to the main axle beam and a second rod end coupled by a spherical bearing to the chassis.

5. The system of claim 1, wherein the centralizer comprises a side location rod having a first rod end coupled by a spherical bearing to the main axle beam near the first beam end and a second rod end coupled by a spherical bearing to the chassis near the second beam end.

6. The system of claim 1, wherein the chassis is supported primarily by the first and second shock absorbing members.

7. The system of claim 1, wherein the first and second shock absorbing members are shock absorbers.

8. The system of claim 7, wherein the shock absorbers are double-sided shock absorbers.

9. The system of claim 1, wherein the shock absorbing members are displacement cylinders.

10. The system of claim 9, further comprising dedicated accumulators in fluid communication with each of the displacement cylinders.

11. The system of claim 10, wherein each accumulator has a gas chamber and a working fluid chamber that are maintained at the same pressure.

12. The system of claim 11, wherein the working fluid fills the working fluid chamber and the displacement cylinder.

13. The system of claim 11, wherein the gas chamber is charged with gas at sufficient pressure to support the static weight of the vehicle at a position about halfway through the displacement cylinder range of extension.

14. The system of claim 9, further comprising a hydraulic pressure source in fluid communication with the displacement cylinders for extending or retracting the cylinders.

15. The system of claim 1, wherein the first and second shock absorbing members are air springs.

16. The system of claim 1, wherein the track assembly comprises:
    a track frame having first and second ends, wherein the track frame is mounted for rocking movement on the pivot shaft at a location between the first and second ends;
    a drive wheel positioned adjacent and above the pivot shaft;
    an idler wheel link pivotally attached to the first end of the track frame, extending upwardly therefrom and terminating in an upward end;
    a first idler wheel mounted for rotation on the upper end of the idler wheel link;
    a second idler wheel mounted for rotation on the second end of the track frame;
    a continuous track engaging the drive wheel, the first idler wheel, and the second idler wheel; and
    take-up means mechanically linking the first idler wheel and link and the track frame for biasing the upper end of the idler wheel link away from the pivot shaft in direct reaction to the rocking motion of the track frame away from the horizontal so as to move the first idler wheel away from the pivot shaft and thereby maintain a substantially constant circumference around the idler wheels and drive wheel.

* * * * *